United States Patent
Liu et al.

(10) Patent No.: US 10,959,140 B2
(45) Date of Patent: Mar. 23, 2021

(54) WIRELESS COMMUNICATION METHOD AND DEVICE

(71) Applicant: GUANGDONG OPPO MOBILE TELECOMMUNICATIONS CORP., LTD., Guangdong (CN)

(72) Inventors: Jianhua Liu, Guangdong (CN); Zhi Zhang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/354,037

(22) Filed: Mar. 14, 2019

(65) Prior Publication Data

US 2019/0215743 A1  Jul. 11, 2019

Related U.S. Application Data

(63) Continuation of application No. PCT/CN2017/088807, filed on Jun. 16, 2017.

(51) Int. Cl.
*H04W 36/00* (2009.01)
*H04W 36/30* (2009.01)
(Continued)

(52) U.S. Cl.
CPC .... *H04W 36/00837* (2018.08); *H04B 17/382* (2015.01); *H04W 36/0058* (2018.08);
(Continued)

(58) Field of Classification Search
None
See application file for complete search history.

(56) References Cited

U.S. PATENT DOCUMENTS 8,891,394 B2  11/2014  Jung et al.
2017/0094624 A1  3/2017  Balachandran et al.
(Continued)

FOREIGN PATENT DOCUMENTS

CN  102036264 A  4/2011
CN  102595436 A  7/2012
(Continued)

OTHER PUBLICATIONS

International Search Report for PCT/CN2017/088807 dated Feb. 1, 2018 and its English translation provided by WIPO.
(Continued)

*Primary Examiner* — Erika A Washington
(74) *Attorney, Agent, or Firm* — Ladas & Parry, LLP

(57) ABSTRACT

Embodiments of the present application provide wireless communication method and device, which can obtaining a determination of a signal quality of a cell according to a measurement result of at least one synchronization signal block of a plurality of synchronization signal blocks transmitted in the cell, thereby realizing a judgment of the signal quality of the cell in a 5G system. The method includes: performing, by a terminal device, measurement on at least one synchronization signal block of a plurality of synchronization signal blocks transmitted in a first cell; determining, by the terminal device, a signal quality corresponding to the first cell according to a measurement result.

12 Claims, 4 Drawing Sheets

200

Performing, by a terminal device, measurement on at least one synchronization signal block of a plurality of synchronization signal blocks transmitted in a first cell  /210

Determining, by the terminal device, a signal quality corresponding to the first cell according to a measurement result  /220

(51) Int. Cl.
*H04W 56/00* (2009.01)
*H04B 17/382* (2015.01)
(52) U.S. Cl.
CPC ... *H04W 36/0072* (2013.01); *H04W 36/0085* (2018.08); *H04W 36/0088* (2013.01); *H04W 36/30* (2013.01); *H04W 56/00* (2013.01)

(56) References Cited

U.S. PATENT DOCUMENTS

| | | | | |
|---|---|---|---|---|
| 2018/0213493 | A1* | 7/2018 | Chakraborty | H04L 1/1692 |
| 2018/0324022 | A1* | 11/2018 | Sheng | H04L 5/0094 |
| 2018/0359716 | A1* | 12/2018 | Bai | H04W 56/001 |
| 2019/0327650 | A1* | 10/2019 | Yiu | H04W 36/08 |
| 2020/0022040 | A1* | 1/2020 | Chen | H04W 76/27 |

FOREIGN PATENT DOCUMENTS

| | | |
|---|---|---|
| CN | 103906127 A | 7/2014 |
| CN | 104205947 A | 12/2014 |
| CN | 106304273 A | 4/2017 |
| CN | 106793058 A | 5/2017 |
| EP | 2422542 B1 | 9/2017 |
| JP | 2012529782 A | 11/2012 |
| RU | 2608538 C1 | 1/2017 |
| WO | 2016064315 A1 | 4/2016 |
| WO | 2018227631 A1 | 12/2018 |

OTHER PUBLICATIONS

Office Action and Search Report in Taiwanese application No. 107120596 and English translation provided by Google Translate.
Ericsson: "Signal Quality Measurement for Mobility in NR"; R4-1705323 Signal Quality Measurement Project (3GPP); Mobile Competence Centre; 650, Route Des Lucioles; F-06921 Sophia-Antipolis Cesex; vol. RAN WG4, no. Hangzhou, China; 20170515-20170519; May 14, 2017.
ZTE: "Discussion on cell quality derivation from N beams", R2-1704641 Discussion on Cell Quality Derivation From N Beams, 3GPP,Mobile Competence Centre; 650, Route Des Lucioles; F-06921 Sophia-Antipolis Cede; vol. RAN WG2, no. Hangzhou, China; 20170515-20170519; May 14, 2017.
Extended European Search Report from EP app. No. 17914101.5, dated Sep. 16, 2019.
The second Office Action of corresponding Chinese application No. 201780052412.1, dated Jul. 1, 2020.
The first Office Action of corresponding Russian application No. 2019139993, dated Aug. 5, 2020.
The Notice of Rejection of corresponding Taiwan application No. 107120596, dated May 27, 2020.
R1-1709838; WF on RRM measurement, 3GPP TSG RAN WG1 Meeting #89 Hangzhou, P.R. China, May 15-19, 2017.
R1-1709887; Multiple SS blocks in wideband CC, 3GPP TSG RAN WG1 NR Ad-Hoc#2 Qingdao, P.R. China Jun. 27-30, 2017.
The First Office Action of corresponding Chinese application No. 201780052412.1, dated Mar. 17, 2020.
LG Electronics, 3GPP TSG RAN WG1 Meeting #88 R1-1702443, Discussion on RRM measurement in NR, published Feb. 17, 2017.
The First Office Action of corresponding European application No. 17914101.5, dated May 15, 2020.
The third Office Action of corresponding Chinese application No. 201780052412.1, dated Nov. 9, 2020.
The second Office Action of corresponding European application No. 17914101.5, dated Aug. 31, 2020.
The third Office Action of corresponding European application No. 17914101.5, dated Jan. 21, 2021.
"3rd Generation Partnership Project; Technical Specification Group Radio Access Network; Evolved Universal Terrestrial Radio Access(E-UTRA); Radio Resource Control (RRC); Protocol specification (Release 14)", 3GPP Standard; Technical Specification; 3GPP TS 36.331, 3rd Generation Partnership Project (3GPP), Mobile Competence Centre; 650, Route des Lucioles; F-06921 Sophia-Antipolis Cedex; France, vol. RAN WG2, No. V14.2.2, Apr. 20, 2017(Apr. 20, 2017), XP051298184.

* cited by examiner

WIRELESS COMMUNICATION METHOD AND DEVICE

CROSS-REFERENCE TO RELATED APPLICATION

This application is a continuation of International Application No. PCT/CN2017/088807, filed on Jun. 16, 2017, the disclosure of which is hereby incorporated by reference in its entirety.

TECHNICAL FIELD

The present application relates to the field of communication, and more particularly, to wireless communication method and device.

BACKGROUND

In a long term evolution (LTE) system, a terminal device can perform measurement on a reference signal transmitted by a base station to obtain a signal quality of a cell.

The terminal device can determine whether to trigger cell handover according to the signal quality of the cell.

In a future $5^{th}$ generation (5G) system, how to judge the signal quality of a cell is an urgent problem to be solved.

SUMMARY

Embodiments of the present application provide wireless communication method and device, which can perform a judgment of a signal quality of a cell according to a measurement result of at least one synchronization signal block of a plurality of synchronization signal blocks transmitted in the cell, thereby implementing the judgment of the signal quality of the cell in a 5G system.

In a first aspect, a wireless communication method is provided, including:

performing, by a terminal device, measurement on at least one synchronization signal block of a plurality of synchronization signal blocks transmitted in a first cell; and determining, by the terminal device, a signal quality corresponding to the first cell according to a measurement result.

Therefore, in the embodiment of the present application, a judgment of the signal quality of the cell may be conducted according to the measurement result of the at least one synchronization signal block of the plurality of synchronization signal blocks transmitted in the cell, thereby realizing the judgment of the signal quality of the cell in the 5G system.

In combination with the first aspect, in a possible implementation manner of the first aspect, each of the plurality of synchronization signal blocks occupies a different frequency domain resource, respectively.

In combination with the first aspect as such or any one of the above possible implementation manners, in another possible implementation manner of the first aspect, the first cell includes a current serving cell of the terminal device and/or is a neighbour cell of the terminal device.

In combination with the first aspect as such or any one of the above possible implementation manners, in another possible implementation manner of the first aspect, the method further includes:

receiving, by the terminal device, indication information transmitted by a network device, where the indication information is configured to indicate the at least one synchronization signal block to be measured.

In combination with the first aspect as such or any one of the above possible implementation manners, in another possible implementation manner of the first aspect, the first cell is a current serving cell of the terminal device, and the at least one synchronization signal block is a synchronization signal block for the terminal device to perform synchronization.

Based on such implementation manner, since it only need to perform measurement according to the synchronization signal block for the terminal device to perform the synchronization, fewer synchronization signal blocks are needed to be measured, and thus burden of the terminal device becomes lighter.

In combination with the first aspect as such or any one of the above possible implementation manners, in another possible implementation manner of the first aspect, the at least one synchronization signal block is all synchronization signal blocks in the first cell.

Based on such implementation manner, the terminal device may perform measurement on all synchronization signal blocks in the first cell, and can integrate measurement results of all the synchronization signal blocks to determine the signal quality corresponding to the first cell.

For such implementation manner, if the first cell is a current serving cell of the terminal device, if there are signals with better quality of some frequency resources on component carriers, the terminal device does not need to trigger a reporting event, which reduces a probability for the terminal device to handover to other cells, and uses different frequency resources of the present cell as much as possible to provide the user better service.

In combination with the first aspect as such or any one of the above possible implementation manners, in another possible implementation manner of the first aspect, the at least one synchronization signal block is all synchronization signal blocks within an operating bandwidth of the terminal device.

Based on such implementation manner, the terminal device can be prevented from measuring a SS block outside its own operating bandwidth, and can be prevented from excessive measurement on different frequency resources, because during measurement by the terminal device, measurement is possible only if the terminal device is tuned to a corresponding frequency resource, which is a complicated processing.

In combination with the first aspect as such or any one of the above possible implementation manners, in another possible implementation manner of the first aspect, the at least one synchronization signal block is all synchronization signal blocks in a set of configured synchronization signal blocks.

Specifically, pre-configuration (factory pre-configuration or network device pre-configuration) may be performed on a synchronization signal block in a set of synchronization signal blocks within a bandwidth component carrier for measurement, and the synchronization signal block included in the set of synchronization signal blocks may be changed according to actual conditions. The set of synchronization signal blocks may include all or part of the synchronization signal blocks within the cell.

In combination with the first aspect as such or any one of the above possible implementation manners, in another possible implementation manner of the first aspect, the determining, by the terminal device, the signal quality corresponding to the first cell according to the measurement result, includes:

when the synchronization signal block under measurement includes a plurality of synchronization signal blocks, processing the measurement result of the plurality of synchronization signal blocks under measurement to determine the signal quality corresponding to the first cell.

In combination with the first aspect as such or any one of the above possible implementation manners, in another possible implementation manner of the first aspect, the processing the measurement result of the plurality of synchronization signal blocks under measurement to determine the signal quality corresponding to the first cell, includes:

performing an averaging processing on the measurement result of the plurality of synchronization signal blocks under measurement to determine the signal quality corresponding to the first cell.

In combination with the first aspect as such or any one of the above possible implementation manners, in another possible implementation manner of the first aspect, the determining, by the terminal device, the signal quality corresponding to the first cell according to the measurement result, includes;

when the synchronization signal block under measurement includes a plurality of synchronization signal blocks, determining a result with a best signal quality or a result with a worst signal quality in the measurement result of the plurality of synchronization signal blocks under measurement as the signal quality corresponding to the first cell.

In combination with the first aspect as such or any one of the above possible implementation manners, in another possible implementation manner of the first aspect, the method further includes:

performing an operation corresponding to a first trigger condition when the signal quality corresponding to the first cell satisfies the first trigger condition.

In combination with the fast aspect as such or any one of the above possible implementation manners, in another possible implementation manner of the first aspect, the operation corresponding to the first trigger condition is to start to report information indicating the signal quality corresponding to the first cell.

In combination with the first aspect as such or any one of the above possible implementation manners, in another possible implementation manner of the first aspect, the operation corresponding to the first trigger condition is: to perform measurement on a synchronization signal block and/or a reference signal transmitted in a second cell, and/or to start to report information indicating a signal quality corresponding to the second cell, where the signal quality corresponding to the second cell is obtained by measuring the synchronization signal block and/or the reference signal transmitted in the second cell.

In a second aspect, a terminal device is provided for performing the method according to the first aspect as such or any one of the above possible implementation manners of the first aspect. Specifically, the terminal device includes functional modules for performing the method according to the first aspect as such or any one of the above possible implementation manners of the first aspect.

In a third aspect, a terminal device is provided, including a processor, a memory and a transceiver. The processor, the memory and the transceiver communicate with each other through an internal connection path, and transmit control and/or data signals, such that the terminal device performs the method according to the first aspect as such Or any one of the above possible implementation manners of the first aspect.

In a fourth aspect, a computer readable medium is provided for storing a computer program, the computer program includes instructions for performing any one of the above methods or the method in any one of the possible implementation manners.

In a fifth aspect, a computer program product including instructions is provided, when the computer program product is executed on a computer, the computer is made to perform any one of the above methods or the method in any one of the possible implementation manners.

BRIEF DESCRIPTION OF THE DRAWINGS

The appended drawings required in the description of the embodiments or the prior art are briefly described below to more clearly illustrate the technical solution of the embodiments of the present application. Obviously, the appended drawings in the following description are only some embodiments of the present application. Those skilled in the art can obtain other drawings according to these appended drawings without any creative labor.

DESCRIPTION OF EMBODIMENTS

The technical solutions in the embodiments of the present application will be described below in combination with the appended drawings in the embodiments of the present application. Obviously, the described embodiments are part of the embodiments of the present application, but not all of them. All other embodiments obtained by those skilled in the art based on the embodiments of the present application without any creative labor shall fall within the protection scope of the present application.

The technical solutions of the embodiments of the present application can be applied to various communication systems, such as global system of mobile communication (GSM) system, code division multiple access (CDMA) system, wideband code division multiple access (WCDMA) system, general packet radio service (GPRS), long term Evolution (LTE) system, LTE frequency division duplex (FDD) system, LTE time division duplex (TDD) system, universal mobile telecommunication system (UMTS), a worldwide interoperability for microwave access (WiMAX) communication system, or future 5G system (which is also referred as New Radio (NR) system).

Figure 1:
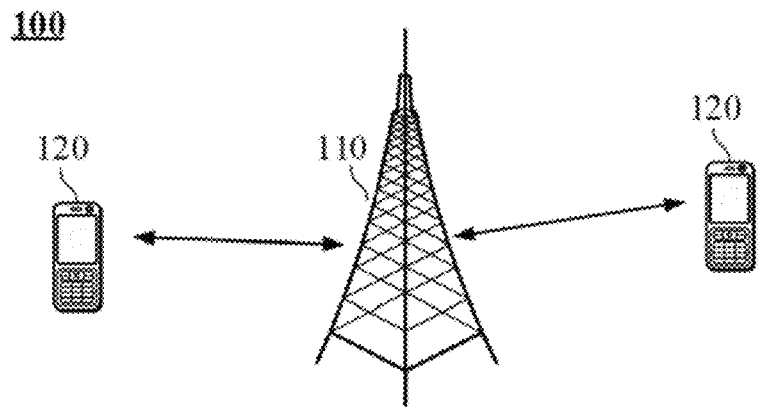
FIG. 1 is a schematic diagram of a wireless communication system according to an embodiment of the present application.

FIG. 1 illustrates wireless communication system 100 to which the embodiment of the present application applies. The wireless communication system 100 may include network device 110. The network device 110 may be a device that communicates with a terminal device. The network device 110 may provide communication coverage for a specific geographic area, and may communicate with terminal devices (e.g., UEs) located within a coverage area. In an embodiment, the network device 110 may be a base transceiver station (BTS) in the GSM system or in the CDMA system, or may be a NodeB (NB) in the WCDMA system, or may, be an Evolutional Node B (eNB or eNodeB) in the LTE system, or may be a wireless controller in a cloud radio access network (CRAN), or the network device may be a relay station, an access point, an vehicle-mounted device, a wearable device, a network side device in the future 5G network or a network device in the future evolution public land mobile network (PLMN), etc.

The wireless communication system 100 also includes at least one terminal device 120 located within the coverage area of network device 110. The terminal device 120 may be mobile or fixed. In an embodiment, the terminal device 120 may refer to an access terminal, a user equipment (UE), a subscriber unit, a subscriber station, a mobile station, a mobile table, a remote station, a remote terminal, a mobile device, a user terminal, a terminal, a wireless communication device, a user agent or a user device. The access terminal may be a cellular phone, a cordless phone, a session initiation protocol (SIP) phone, a wireless local loop station, a personal digital assistant (PDA), a handheld device with a wireless communication function, a computing device or other processing devices connected to a wireless modem, a vehicle-mounted device, a wearable device, a terminal device in the future 5G network, or a terminal device in the future evolution PLMN, etc.

In an embodiment, device to device (D2D) communication may be performed between the terminal devices 120.

In an embodiment, the 5G system or network may also be referred to as a New Radio (NR) system or network.

FIG. 1 exemplarily illustrates one network device and two terminal devices. In an embodiment, the wireless communication system 100 may include a plurality of network devices, and a coverage area of each network device may include an additional number of terminal devices therein, which is not limited in the embodiments of the present application.

In an embodiment, the wireless communication system 100 may further include other network entities, such as a network controller, a mobility management entity, etc, which is not limited in the embodiments of the present application.

It should be understood that terms "system" and "network" are often used interchangeably herein. The term "and/or" used herein merely refers to an association relationship describing associated objects, indicating that there may be three relationships, for example, A and/or B may indicate three cases: A exists separately, both A and B exist, or B exists separately. In addition, the character "/" used herein generally indicates that there is a "or" relationship between contextual objects.

Figure 2:
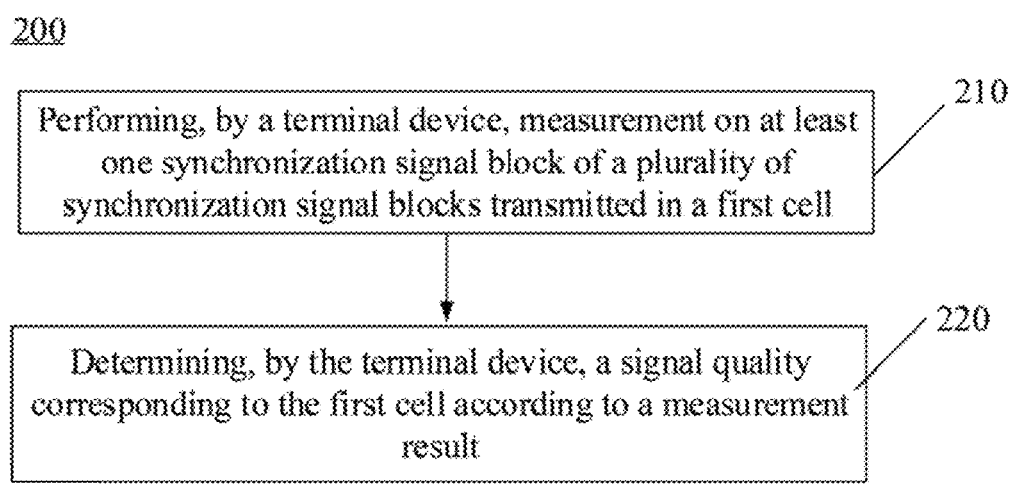
FIG. 2 is a schematic flowchart of a wireless communication method according to an embodiment of the present application.

FIG. 2 is a schematic flowchart of a wireless communication method 200 according to an embodiment of the present application. In an embodiment, the method 200 is applicable to the system shown in FIG. 1, but is not limited thereto. As shown in FIG. 2, the method 200 includes at least some of the following.

In 210, a terminal device performs measurement on at least one synchronization signal block of a plurality of synchronization signal blocks transmitted in a first cell.

In an embodiment, the cell in the embodiment of the present application may be equivalent to a carrier (component carrier).

In an embodiment of the present application, each of the plurality of synchronization signal blocks (SSBs) occupies a different frequency domain resource, respectively. In an embodiment, the frequency domain resources between the synchronization signal blocks do not overlap.

A 5G system can support broadband component carriers with large bandwidth, such as a broadband component carriers with a bandwidth of 400 MHz or even 1 GHz. For the broadband component carrier with extremely large bandwidth, propagation characteristics of different frequency positions thereof may behave much differently. For example, there is a big difference between aspects such as a path loss at a high frequency band and a path loss at a low frequency band of the broadband component carrier. Upon this, multiple synchronization signal (SS) Blocks can be transmitted within the bandwidth component carrier.

For the terminal device, terminals with multiple operating bandwidths are distributed within the same system broadband component carrier due to different usage scenarios and different cost considerations. For example, if the system bandwidth is 400 MHz, terminals with bandwidth of 400 MHz may be distributed. There may also be terminal devices with bandwidth of 100 MHz, 40 MHz, and 10 MHz. Thus, if there is only one SS block position in the system broadband component carrier, the terminal with a smaller operating bandwidth may not have SS block within its operating bandwidth. Therefore, a position of a transmitted SS Block may be added, so as to increase a probability that the SS Block presents in the operating bandwidth of the terminal device or nearby the operating bandwidth of the terminal device. The terminal device can be tuned to a frequency position where the SS block is located when it requires to receive the SS block for time-frequency synchronization, radio resource management (RRM) and reading a physical broadcast channel (PBCH).

Figure 3:
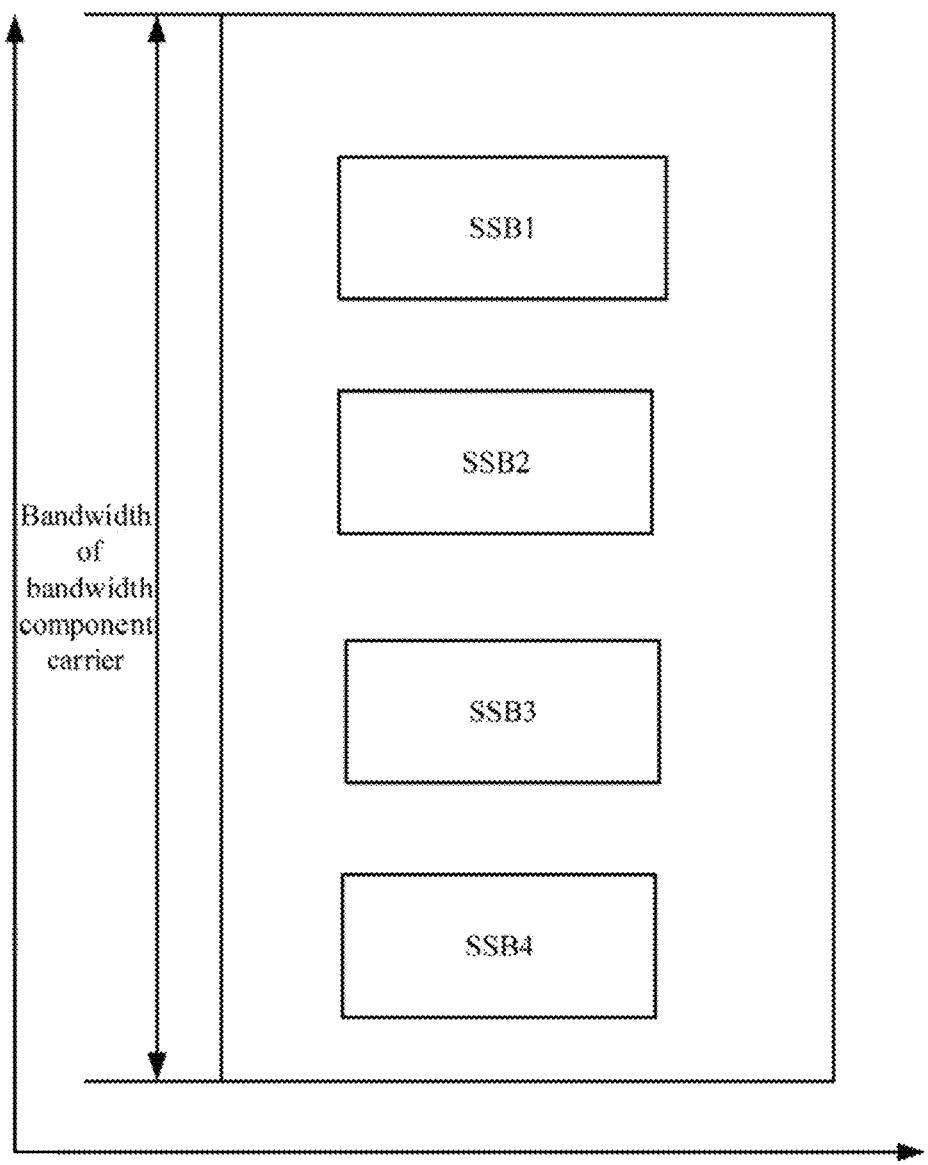
FIG. 3 is a schematic distribution diagram of a synchronization signal block according to an embodiment of the present application.

In the 5G system, a network device may transmit an SS burst set including a plurality of synchronization signal blocks to the terminal device, and each SS block (SSB) includes a primary synchronization signal (PSS), a secondary synchronization signal (SSS) and physical broadcasting channel (PBCH). The frequency position of the SS block within the system bandwidth is not limited to a central frequency point position of the system bandwidth. For example, as shown in FIG. 3, SSB1, SSB2, SSB3 and SSB4 may be transmitted within a bandwidth of the bandwidth component carrier, and these four SSBs may occupy a different frequency domain resource.

In an embodiment of the present application, the first cell is a current serving cell of the terminal device or a neighbour cell of the terminal device. The neighbour cell and the serving cell to which the terminal device belongs may belong to a same network (for example, both belong to a NR system), or belong to different networks (for example, the serving cell belongs to the NR system, and the neighbour cell belongs to an LTE system).

In an embodiment of the present application, the network device may transmit indication information to the terminal device, where the indication information is configured to indicate at least one synchronization signal block to be measured, and the terminal device may perform measurement on a corresponding synchronization signal block according to the indication information transmitted by the network device.

In an present embodiment, the synchronization signal block that needs to be measured may also be preset (factory preset) on the terminal device, without needing the indication of the network device.

In 220, the terminal device determines a signal quality corresponding to the first cell according to a measurement result.

In an embodiment, the measurement result mentioned in the embodiment of the present application may include a signal strength, for example, reference signal receiving power (RSRP), or a signal strength similar to RSRP; and/or, include a relational value of signal and interference, for example, reference signal receiving quality (RSRQ), signal to interference plus noise ratio (SINR), or a value similar to RSRQ or SINR.

In an embodiment, when the synchronization signal block under measurement includes a plurality of synchronization signal blocks, the measurement result of the plurality of synchronization signal blocks under measurement is processed to determine the signal quality corresponding to the first cell.

Specifically, an averaging processing is performed on the measurement result of the plurality of synchronization signal blocks under measurement to determine the signal quality corresponding to the first cell, where the processing may be an arithmetic averaging processing or a weighted averaging processing.

In an embodiment of the present application, when the synchronization signal block under measurement includes a plurality of synchronization signal blocks, a result with a best signal quality or a result with a worst signal quality in the measurement result of the plurality of synchronization signal blocks under measurement is determined as the signal quality corresponding to the first cell.

In an implementation manner, the first cell is a current serving cell of the terminal device, and the at least one synchronization signal block under measurement is a synchronization signal block for the terminal device to perform synchronization.

Based on the implementation manner, since it only need to perform measurement according to the synchronization signal block for the terminal device to perform the synchronization, fewer synchronization signal blocks are needed to be measured, and thus burden of the terminal device becomes lighter.

When the terminal device performs the measurement on the synchronization signal block for synchronization, and there is only one such synchronization signal block under measurement, the measurement result of the one synchronization signal can be determined as the signal quality corresponding to the first cell.

In an implementation manner, the at least one synchronization a final block under measurement is all synchronization signal blocks in the first cell.

Based on the implementation manner, the terminal device may perform measurement on all synchronization signal blocks in the first cell, and can integrate measurement results of all the synchronization signal blocks to determine the signal quality corresponding to the first cell.

For such implementation manner, if the first cell is a current serving cell of the terminal device, if there are signals with better quality of some frequency resources on component carriers, the terminal device does not need to trigger a reporting event, which reduces a probability for the terminal device to handover to other cells, and uses different frequency resources of the present cell as much as possible to provide the user better service.

In an implementation manner, the at least one synchronization signal block under measurement is all synchronization signal blocks within an operating bandwidth of the terminal device.

Specifically, the terminal device may perform measurement on the synchronization signal block detected on its own operating bandwidth.

For example, when one component carrier is 400 MHz from the network side, every 100 MHz contains one SS block, UE's own bandwidth is 200 MHz, and a low frequency of a corresponding component carrier is 200 MHz, which covers two SS blocks, the measurement is performed on such two SS blocks.

Based on such implementation manner, the terminal device can be prevented from measuring a SS block outside its own operating bandwidth, and can be prevented from excessive measurement on different frequency resources, because during measurement by the terminal device, measurement is possible only if the terminal device is tuned to a corresponding frequency resource, which is a complicated processing.

In an implementation manner, the at least one synchronization signal block is all synchronization signal blocks in a set of configured synchronization signal blocks.

Specifically, pre-configuration (factory pre-configuration or network device pre-configuration) may be performed on a synchronization signal block in a set of synchronization signal blocks within a bandwidth component carrier for measurement, and the synchronization signal block included in the set of synchronization signal blocks may be changed according to actual conditions. The set of synchronization signal blocks may include all or part of the synchronization signal blocks within the cell.

In an embodiment of the present application, an operation corresponding to a first trigger condition is performed when the signal quality corresponding to the first cell satisfies the first trigger condition.

In an implementation manner, the operation corresponding to the first trigger condition is to start to report information indicating the signal quality corresponding to the first cell.

For example, when the first cell is the current serving cell of the terminal device, if the signal quality corresponding to the first cell is worse than a certain value, the terminal device may start to report the information indicating the signal quality corresponding to the first cell, so that the terminal device may determine, based on the information, whether a cell handover should be performed on the terminal device.

For example, when the first cell is the neighbour cell of the terminal device, if the signal quality corresponding to the first cell is better than a certain value, the terminal device may start to report the information indicating the signal quality corresponding to the first cell, so that the terminal device may determine, based on the information, whether a cell handover should be performed on the terminal device.

For example, when the first cell includes both the current serving cell and the neighbour cell of the terminal device, if the signal quality corresponding to the current serving cell is worse than a certain value, and the signal quality of the neighbour cell of the terminal device is better than a certain value, the terminal device may start to report information indicating the signal quality of the current serving cell and the neighbour cell, so that the terminal device may determine, based on the information, whether a cell handover should be performed on the terminal device.

In an implementation manner, the operation corresponding to the first trigger condition is: to perform measurement on a synchronization signal block and/or a reference signal transmitted in a second cell, and/or to start to report information indicating a signal quality corresponding to the second cell, where the signal quality corresponding to the second cell is obtained by measuring the synchronization signal block and/or the reference signal transmitted in the second cell.

For example, when the first cell is the current serving cell of the terminal device, if the signal quality corresponding to the first cell is worse than a certain value, the terminal device may perform measurement on a synchronization signal block and/or a reference signal of a neighbour cell, and/or start to report information indicating a signal quality corresponding to the neighbour cell, so as to prepare for subsequent possible cell handover.

For example, when the first cell is a neighbour cell of the terminal device, if the signal quality corresponding to the first cell is worse than a certain value, the terminal device may perform measurement on a synchronization signal block and/or a reference signal of other neighbour cells, and/or start to report information indicating a signal quality corresponding to the other neighbour cells, so as to prepare for subsequent possible cell handover.

In an embodiment, the reference signal mentioned in the embodiment of the present application may be a channel state information reference signal (CSI-RS) or a downlink cell-specific reference signal (CRS).

In an embodiment, the second cell and the first cell may belong to the same network or belong to different networks.

For ease of understanding, the following description wilt be combined with several events.

Event A1 (Serving becomes better than threshold); indicates that the signal quality of the serving cell becomes better than a certain threshold. When an event that satisfies this condition is reported, the network device may stop inter frequency/inter system measurement.

Event A2 (Serving becomes worse than threshold); indicates that the signal quality of the serving; cell becomes worse than a certain threshold. When an event that satisfies this condition is reported, the network device may start the inter frequency/inter system measurement.

Event A3 (Neighbour becomes offset better than serving); indicates that a quality of a same frequency neighbour cell becomes better than the quality of the serving cell. When an event that satisfies this condition is reported, the network device starts a same frequency handover request.

Event A4 (Neighbour becomes better than threshold); indicates that a quality of an inter frequency neighbour cell becomes better than a certain threshold quantity. When an event that satisfies this condition is reported, the network device can start an inter frequency handover request.

Event A5 (Serving becomes worse than threshold 1 and neighbour becomes better than threshold 2): indicates that the quality of the serving cell becomes worse than a certain threshold, and the quality of the neighbour cell becomes better than a certain threshold.

Event B1 (Inter RAT neighbour becomes better than threshold): indicates that a quality of an inter system neighbour cell becomes higher than a certain threshold. When an event that satisfies this condition is reported, the network device can start a inter system handover request.

Event B2 (Serving becomes worse than threshold 1 and inter RAT neighbour is better than threshold 2): indicates that the quality of the serving cell becomes worse than a certain threshold, and the quality of the inter system neighbour cell becomes better than a certain threshold.

In order to understand the above events more clearly, detailed description will be given below with combination of Event A2 and Event A3.

Event A2

A trigger condition for Event A2 is: Ms+Hys<Thresh; and a cancellation conditions for Event A2 is: Ms−Hys>Thresh;

where Ms is a measurement result of the serving cell; Hys is a delay parameter of the event; Thresh is a trigger threshold of the event.

Event A3

A trigger condition for Event A3 is: Mn+Ofn+Ocn−Hys>Ms+Ofs+Ocs+Off; and a cancellation condition for Event A3 is: Mn+Ofn+Ocn+Hys<Ms+Ofs+Ocs+Off;

where Mn is a measurement result of the neighbour cell; Ofn is a frequency specific deviation of the neighbour cell; Ocn is a cell specific deviation of the neighbour cell; Ms is the measurement result of the current serving cell; Ofs is a frequency specific deviation of the serving cell; Ocs is a cell specific deviation of the neighbour cell; Hys is the delay parameter of the event.

It should be understood that the events triggering reporting of the measurement in the embodiment of the present application may also be other events, and the above events should not constitute a particular limitation of the embodiments of the present application.

Figure 4:
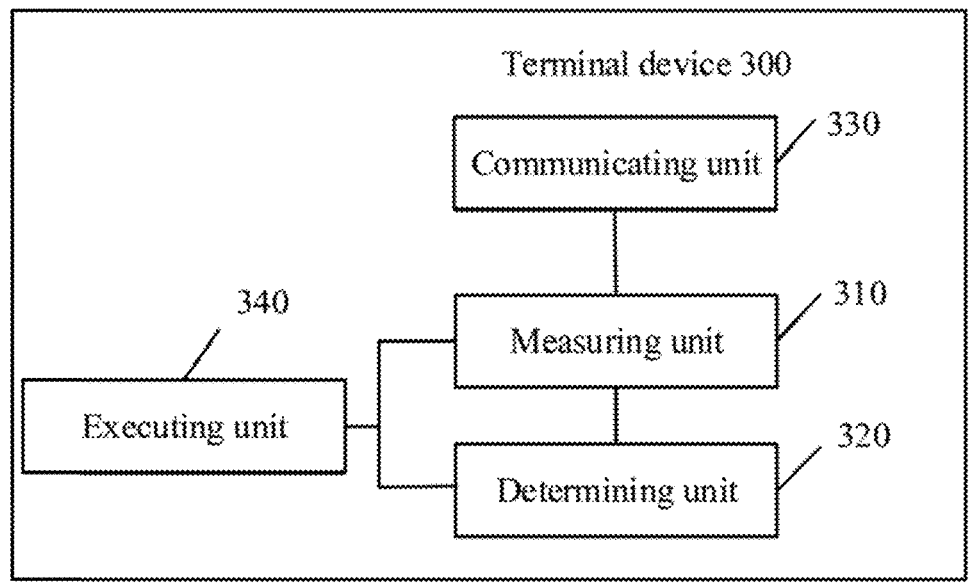
FIG. 4 is a schematic block diagram of a terminal device according to an embodiment of the present application.

Therefore, in the embodiment of the present application, a determination of the signal quality of the cell may be obtained according to the measurement result of the at least one synchronization signal block of the plurality of synchronization signal blocks transmitted in the cell, thereby realizing a judgment of the signal quality of the cell in the 5G system FIG. 4 is a schematic block diagram of a terminal device 300 according to an embodiment of the present application. As shown in FIG. 4, the terminal device 300 includes a measuring unit 310 and a determining unit 320; where the measuring unit 310 is configured to: perform measurement on at least one synchronization signal block of a plurality of synchronization signal blocks transmuted in the first cell; and the determining unit 320 is configured to: determine a signal quality corresponding to the first cell according to a measurement result.

In an embodiment, each of the plurality of synchronization signal blocks occupies a different frequency domain resource, respectively.

In an embodiment, the first cell is a current serving cell of the terminal device or a neighbour cell of the terminal device.

In an embodiment, as shown in FIG. 4, the terminal device 300 further includes a communicating unit 330; where the communicating unit 330 is configured to:

receive indication information transmitted by a network device, where the indication information is configured to indicate the at least one synchronization signal block to be measured.

In an embodiment, the first cell is a current serving cell of the terminal device, and the at least one synchronization signal block is a synchronization signal block for the terminal device to perform synchronization.

In an embodiment, the at least one synchronization signal block is all synchronization signal blocks in the first cell.

In an embodiment, the at least one synchronization signal block is all synchronization signal blocks within an operating bandwidth of the terminal device.

In an embodiment, the at least one synchronization signal block is all synchronization signal blocks in a set of configured synchronization signal blocks.

In an embodiment, the determining unit 320 is further configured to:

when the synchronization signal block, under measurement includes a plurality of synchronization signal blocks, process the measurement result of the plurality of synchronization signal blocks under measurement to determine the signal quality corresponding to the first cell.

In an embodiment, as shown in FIG. 4, the terminal device further includes an executing unit 340; where the executing unit 340 is configured to:

perform an operation corresponding to a first trigger condition when the signal quality corresponding to the first cell satisfies the first trigger condition.

In an embodiment, the operation corresponding to the first trigger condition is to start to report information indicating the signal quality corresponding to the first cell.

In an embodiment, the operation corresponding to the first trigger condition is: to perform measurement on a synchronization signal block and/or a reference signal transmitted in a second cell, and/or to start to report information indicating a signal quality corresponding to the second cell, where the signal quality corresponding to the second cell is obtained by measuring the synchronization signal block and/or the reference signal transmitted in the second cell.

It should be understood that the terminal device 300 may correspond to the terminal device in the method embodiment, and may implement the operation implemented by the terminal device in the method embodiment, which will not be repeated for brevity.

Figure 5:
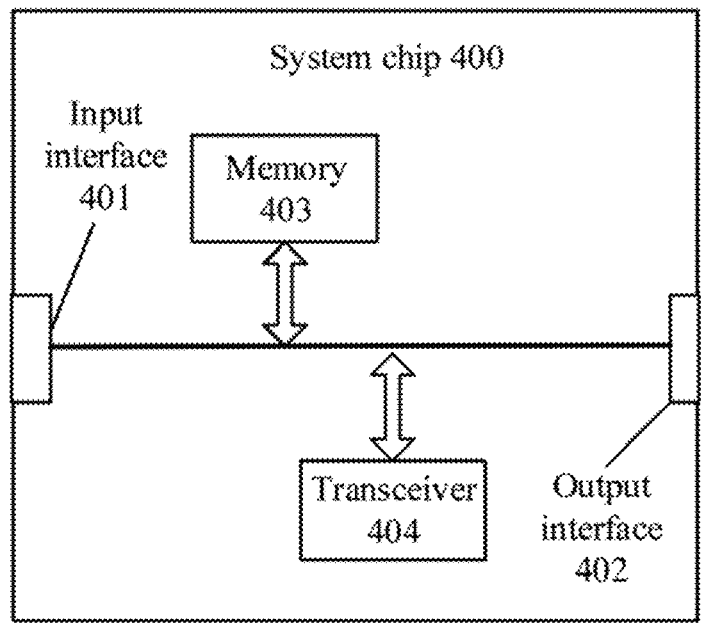
FIG. 5 is a schematic block diagram of a system chip according to an embodiment of the present application.

FIG. 5 is a schematic structural diagram of a system chip 400 according to an embodiment of the present application. The system chip 400 of FIG. 5 includes an input interface 401, an output interlace 402, a processor 403 and a memory 404 that may be connected through an internal communication connection line, and the processor 403 is configured to execute a code in the memory 404.

When the code is executed, the processor 403 implements the method performed by the terminal device in the method embodiment, which will not be repeated for brevity.

Figure 6:
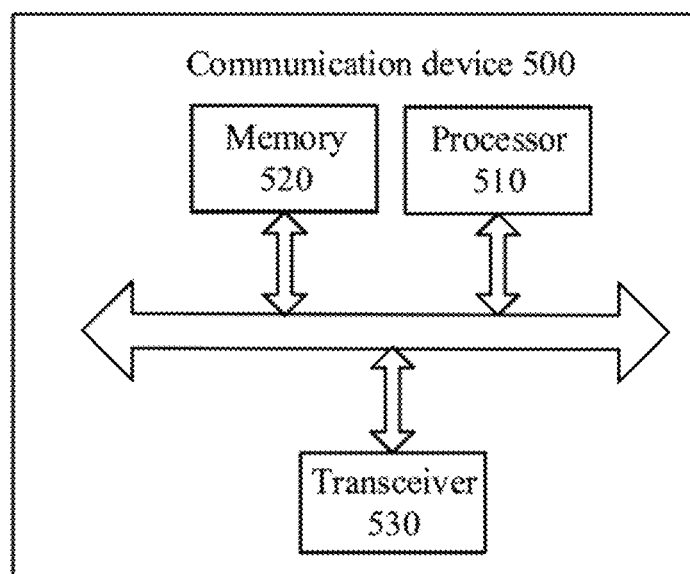
FIG. 6 is a schematic block diagram of a communication device according to an embodiment of the present application.

FIG. 6 is a schematic block diagram of a communication device 500 according to an embodiment of the present application. As shown in FIG. 6, the communication device 500 includes a processor 510 and a memory 520, where the memory 520 may store a program code therein, and the processor 510 may execute the program code stored in the memory 520.

In an embodiment, as shown in FIG. 6, the communication device 500 may include a transceiver 530, and the processor 510 may control the transceiver 530 to communicate externally.

In an embodiment, the processor 510 may call the program code stored in the memory 520 to perform corresponding operations of the terminal device in the method embodiment, which will not be repeated for brevity.

It should be understood that the processor of the embodiment of the present application may be an integrated circuit chip with a signal processing capability. In the implementation process, each step of the above method embodiment may be completed by an integrated logic circuit of a hardware or by an instruction in software form in a processor. The above processor may be a general processor, a digital signal processor (DSP), an application specific integrated circuit (ASIC), a field programmable gate array (FPGA) or other programmable logic devices, discrete gates or transistor logic devices, discrete hardware components, etc. Each method, step and logic block diagram disclosed in the embodiment of the present application can be implemented or performed. The general processor may be a microprocessor, or the processor may also be any conventional processor or the like. Steps of the method disclosed in combination of the embodiments of the present application may be directly embodied as being performed by a hardware decoding processor, or may be performed by a combination of hardware and software modules in the decoding processor. The software module can be located in a mature storage medium in the art such as a random access memory, a flash memory, a read-only memory, a programmable read-only memory or an electrically erasable programmable memory, a registers. The storage medium is located in the memory, and the processor reads information in the memory and completes steps of the above method by combining its hardware.

It should be understood that the memory in the embodiment of the present application may be a volatile memory or a non-volatile memory, or may include both the volatile memory and the non-volatile memory. Where the non-volatile memory may be a read-only memory (ROM), a programmable ROM (PROM), an erasable PROM (EPROM), or an electrically EPROM (EEPROM) or a flash memory. The volatile memory may be a random access memory (RAM) that acts as an external cache. By way of example rather than limiting illustration, RAM of many forms are available, such as a static RAM (SRAM), a dynamic RAM (DRAM), a synchronous DRAM (SDRAM), a double data rate SDRAM (DDR SDRAM), an enhanced SDRAM (ESDRAM), a Synchlink DRAM, (SLDRAM)) and a direct Rambus RAM (DR RAM). It should be noted that memories of the systems and methods described herein are intended to include, but not limited to, these and any other suitable types of memory.

Those skilled in the art will appreciate that units and algorithm steps of each example described in combination with the embodiments disclosed herein can be implemented in electronic hardware or a combination of computer software and electronic hardware. Whether these functions are executed in hardware or software depends on the specific application and design constraints of the technical solution. For each specific application, those skilled in the art can use different methods to implement the described functions, but such implementation should not be considered to be beyond the scope of the present application.

Those skilled in the art can clearly understand that for convenience and brevity of the description, the specific working process of the system, the apparatus and the unit described above may refer to corresponding processes in the above method embodiments, and will not be repeated herein.

In the several embodiments provided by the present application, it should be understood that the disclosed systems, apparatuses, and methods may be implemented in other ways. For example, the apparatus embodiments described above are merely illustrative. For example, the division of the unit is only a logical function division, and there may be other division ways in actual implementation, for example, multiple units or components may be combined or be integrated into another system, or some features may be ignored or not executed. In addition, coupling or direct coupling or communication connection shown or discussed herein may be an indirect coupling or communication connection through some interfaces, apparatuses or units, and may be electrical, mechanical or otherwise.

The units described as separate components may be or may not be physically separated, and the components displayed as units may be or may not be physical units, that is, they may be located in one place, or may be distributed onto multiple network units. Some or all of the units may be selected according to actual needs for the purpose of implementing the solution of the present embodiment.

In addition, each functional unit in each embodiment of the present application may be integrated into one processing unit, or each unit may physically exist, or two or more units may be integrated into one unit.

The functions may be stored in a computer readable storage medium if implemented in the form of a software functional unit, and sold or used as a standalone product. Based on such understanding, the technical solution of the present application, in essence, or the part contributing to the existing technology or the part of the technical solution can be embodied in the form of a software product, which is stored in a storage medium and includes a number of instructions for enabling a computer device (which may be a personal computer, a server, or a network device, etc.) to perform all or part of the steps described in methods in each embodiment of the present application. The above storage medium includes various media that can store program code, such as a U disk, a mobile hard disk, a read-only memory (ROM), a random access memory (RAM), a magnetic disk, or an optical disk.

The above is only a specific implementation form of the present application, the protection scope of the present application is not limited thereto, and modifications or substitutions that can easily be thought of by those skilled in the art within the technical scope disclosed in the present application should be covered by the scope of protection of the present application. Therefore, the protection scope of the present application should be subject to the protection scope of the claims.

What is claimed is:

1. A wireless communication method, comprising:
   performing, by a terminal device, measurement on at least one synchronization signal block of a plurality of synchronization signal blocks transmitted in a first cell; and
   determining, by the terminal device, a signal quality corresponding to the first cell according to a measurement result;
   wherein the method further comprises:
   receiving, by the terminal device, indication information transmitted by a network device, wherein the indication information is configured to indicate the at least one synchronization signal block to be measured;
   wherein the first cell comprises at least one of: a current serving cell of the terminal device and a neighbor cell of the terminal device;
   wherein the at least one synchronization signal block is part of synchronization signal blocks in the first cell or all synchronization signal blocks in a set of configured synchronization signal blocks.

2. The method according to claim 1, wherein each of the plurality of synchronization signal blocks occupies a different frequency domain resource, respectively.

3. The method according to claim 1, wherein the first cell is a current serving cell of the terminal device, and the at least one synchronization signal block is a synchronization signal block for the terminal device to perform synchronization.

4. The method according to claim 1, further comprising:
   performing an operation corresponding to a first trigger condition when the signal quality corresponding to the first cell satisfies the first trigger condition.

5. The method according to claim 4, wherein the operation corresponding to the first trigger condition comprises starting to report information indicating the signal quality corresponding to the first cell; or
   the operation corresponding to the first trigger condition comprises at least one of:
   performing measurement on at least one of a synchronization signal block and a reference signal transmitted in a second cell, and
   starting to report information indicating a signal quality corresponding to the second cell, wherein the signal quality corresponding to the second cell is obtained by measuring at least one of the synchronization signal block and the reference signal transmitted in the second cell.

6. The method according to claim 1, wherein the determining, by the terminal device, the signal quality corresponding to the first cell according to the measurement result, comprises:
   when the synchronization signal block under measurement comprises a plurality of synchronization signal blocks, performing an averaging processing on the measurement result of the plurality of synchronization signal blocks under measurement to determine the signal quality corresponding to the first cell.

7. A terminal device, comprising:
   a memory, a processor, and a computer program stored on the memory and operable on the processor,
   wherein the processor, when running the computer program, is configured to:
   perform measurement on at least one synchronization signal block of a plurality of synchronization signal blocks transmitted in a first cell; and
   determine a signal quality corresponding to the first cell according to a measurement result;
   wherein the processor is further configured to:
   receive indication information transmitted by a network device, wherein the indication information is configured to indicate the at least one synchronization signal block to be measured;
   wherein the first cell comprises at least one of: a current serving cell of the terminal device and a neighbor cell of the terminal device;
   wherein the at least one synchronization signal block is part of synchronization signal blocks in the first cell or all synchronization signal blocks in a set of configured synchronization signal blocks.

8. The terminal device according to claim 7, wherein each of the plurality of synchronization signal blocks occupies a different frequency domain resource, respectively.

9. The terminal device according to claim 7, wherein the first cell is a current serving cell of the terminal device, and the at least one synchronization signal block is a synchronization signal block for the terminal device to perform synchronization.

10. The terminal device according to claim 7, wherein the processor is further configured to:
    perform an operation corresponding to a first trigger condition when the signal quality corresponding to the first cell satisfies the first trigger condition.

11. The terminal device according to claim 10, wherein the operation corresponding to the first trigger condition comprises starting to report information indicating the signal quality corresponding to the first cell; or
    the operation corresponding to the first trigger condition comprises at least one of:

performing measurement on at least one of a synchronization signal block and a reference signal transmitted in a second cell, and starting to report information indicating a signal quality corresponding to the second cell, wherein the signal quality corresponding to the second cell is obtained by measuring at least one of the synchronization signal block and the reference signal transmitted in the second cell.

12. The terminal device according to claim 7, wherein the processor is further configured to:

when the synchronization signal block under measurement comprises a plurality of synchronization signal blocks, perform an averaging processing on the measurement result of the plurality of synchronization signal blocks under measurement to determine the signal quality corresponding to the first cell.

* * * * *